(12) United States Patent
Ichimaru

(10) Patent No.: US 7,217,111 B2
(45) Date of Patent: May 15, 2007

(54) TIRE VULCANIZING APPARATUS

(75) Inventor: Hironobu Ichimaru, Chikugo (JP)

(73) Assignee: Ichimaru Giken Co., Ltd., Fukuoka (JP)

( * ) Notice: Subject to any disclaimer, the term of this patent is extended or adjusted under 35 U.S.C. 154(b) by 0 days.

(21) Appl. No.: 10/524,870

(22) PCT Filed: Aug. 6, 2003

(86) PCT No.: PCT/JP03/10033

§ 371 (c)(1),
(2), (4) Date: Feb. 11, 2005

(87) PCT Pub. No.: WO2004/016407

PCT Pub. Date: Feb. 26, 2004

(65) Prior Publication Data

US 2005/0260294 A1    Nov. 24, 2005

(30) Foreign Application Priority Data

Aug. 12, 2002 (JP) ............................. 2002-234705

(51) Int. Cl.
*B29C 35/02* (2006.01)
(52) U.S. Cl. .................................................... 425/38
(58) Field of Classification Search ............... 425/28.1, 425/34.1, 38
See application file for complete search history.

(56) References Cited

U.S. PATENT DOCUMENTS

| | | | | |
|---|---|---|---|---|
| 3,988,077 A | * | 10/1976 | Naratov et al. ............... | 425/38 |
| 4,025,251 A | * | 5/1977 | Cantarutti .................... | 425/38 |
| 4,131,402 A | | 12/1978 | Pirovano | |
| 6,554,597 B1 | * | 4/2003 | Ichimaru .................... | 425/38 |
| 6,729,865 B2 | | 5/2004 | Ichimaru | |

FOREIGN PATENT DOCUMENTS

| | | |
|---|---|---|
| EP | 0 709 179 A2 | 5/1996 |
| EP | 0 822 046 A2 | 2/1998 |
| JP | 08-127025 | 5/1996 |
| JP | 08-127026 | 5/1996 |
| JP | 10-034660 | 2/1998 |
| JP | 11-138555 | 5/1999 |
| JP | 2000-158447 | 6/2000 |
| JP | 2000-263552 | 9/2000 |
| JP | 2002-086451 | 3/2002 |
| WO | WO00/32373 | 6/2000 |

* cited by examiner

OTHER PUBLICATIONS

U.S. Appl. No. 10/524,299, Applicant: Hironobu Ichimaru, filed Feb. 4, 2005, including specification, claims and 2 sheets of drawings.

*Primary Examiner*—James P. Mackey
(74) *Attorney, Agent, or Firm*—Flynn, Thiel, Boutell & Tanis, P.C.

(57) ABSTRACT

The invention provides a tire vulcanizing apparatus which can reduce time loss and efficiently vulcanize and mold employing a tire loading apparatus for positively loading the green tire, and forming a moving unit in which the tire loading apparatus and the lower mold are integrally connected. The tire vulcanizing apparatus is provided with a tire loading apparatus (2) which loads a green tire (T1) at a tire loading position (X1) and moves the green tire to a tire supplying position (X2), a tire elevating apparatus (5) which elevates at the tire supplying position so as to receive the green tire on the tire loading apparatus and sets the green tire to a lower mold (3), and an upper mold (6) which elevates at a tire vulcanizing position (X3) so as to vulcanize and mold the green tire with respect to the lower mold, the tire loading apparatus and the lower mold simultaneously reciprocate between the respective positions by reciprocating a moving unit (1) in which the tire loading apparatus and the lower mold are integrally connected.

1 Claim, 3 Drawing Sheets

Fig.3 (A) Prior art
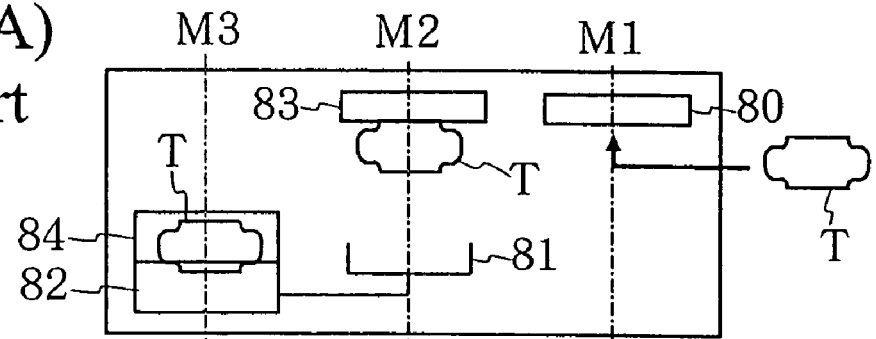
Fig.3 (B) Prior art
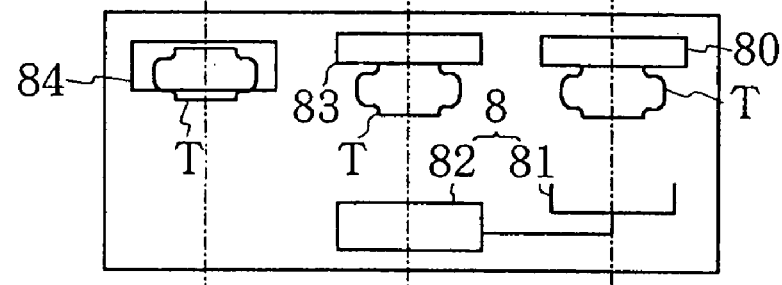
Fig.3 (C) Prior art
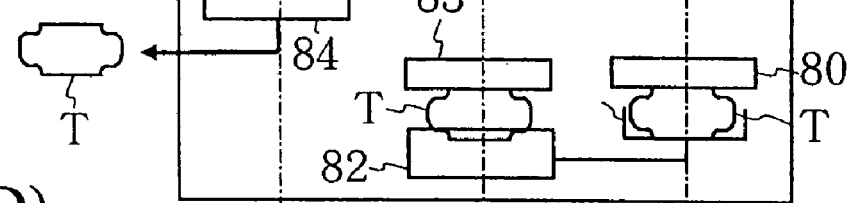
Fig.3 (D) Prior art
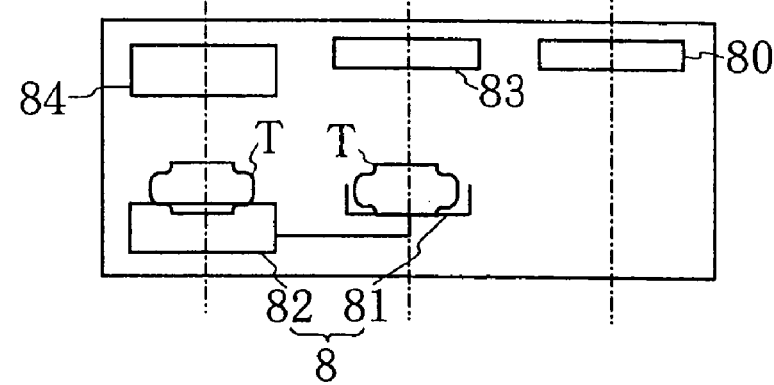

TIRE VULCANIZING APPARATUS

1. TECHNICAL FIELD

The present invention relates to a tire vulcanizing apparatus for continuously vulcanizing and molding a green tire (a raw tire).

2. BACKGROUND ART

Conventionally, a tire vulcanizing apparatus for continuously vulcanizing and molding a green tire is provided with a cradle for receiving the green tire, an upper mold and a lower mold for vulcanizing and molding the green tire, and a tire elevating apparatus for setting the green tire to the lower mold.

The molding step is executed by mounting the green tire on the cradle, temporarily holding the green tire by the tire elevating apparatus, thereafter setting the green tire to the lower mold, and vulcanizing and molding the green tire between the lower mold and the upper mold.

The applicant of the present invention has already proposed a tire vulcanizing apparatus which solves the time loss in the molding step (Japanese Unexamined Patent Publication No. 2000-158447).

The prior art tire vulcanizing apparatus is structured, as shown in FIGS. 3A, 3B, 3C and 3D, such that a tire supplying apparatus 80 receives a green tire T at a tire receiving position M1, is provided with a cradle 81 which moves the received green tire T to a tire supplying position M2, a tire elevating apparatus 83 which elevates at the tire supplying position M2 so as to hold the green tire T on the cradle 81, and sets the green tire T to a lower mold 82, and an upper mold 84 which elevates at a tire vulcanizing position M3 so as to vulcanize and mold the green tire T with respect to the lower mold 82.

Further, the structure is made such that a moving unit 8 in which the cradle 81 and the lower mold 82 are integrally connected is formed, and the lower mold 82 reciprocates between the tire supplying position M2 and the tire vulcanizing position M3 at the same time when the cradle 81 is moved between the tire receiving position M1 and the tire supplying position M2 by reciprocating the moving unit 8.

In the prior art tire vulcanizing apparatus, since the moving unit 8 in which the cradle 81 and the lower mold 82 are integrally connected is formed, the green tire T is supplied to the cradle 81 from the tire supplying apparatus 80 at a time of setting the green tire T to the lower mold 82 by the tire elevating apparatus 83, the lower mold 82 is moved to the tire vulcanizing position M3 from the tire supplying position M2 by setting the green tire T to the lower mold 82 and thereafter moving the moving unit 8, and the cradle 81 is moved to the tire supplying position M2 from the tire receiving position M1.

However, since the cradle 81 has been conventionally used, the cradle 81 is supplied with the green tire T in a passive attitude in which the cradle 81 waits for the green tire T supplied from the tire supplying apparatus 80 at the tire receiving position M1.

Accordingly, when the cradle 81 is provided, the tire supplying apparatus 80 is required as an essential element, and there is required an operation that the tire supplying apparatus 80 elevates at the receiving position M1, receives the green tire T at an ascent position thereof, and passes the received green tire T to the cradle 81 at a descent position.

As mentioned above, when the cradle 81 is provided, since it is necessary to move the cradle 81 (the moving unit 8) in correspondence to an elevating timing of the tire supplying apparatus 80, a moving timing of the lower mold 82 which forms the moving unit 8 together with the cradle 81 is affected.

As a result, an influence is generated in a motion timing of the tire elevating apparatus 83 which sets the green tire T to the lower mold 82, and the upper mold 84 which vulcanizes and molds the green tire T with respect to the lower mold 82. Accordingly, there is left a problem that the time loss is increased such that it is necessary to set a waiting time of each of the apparatuses long.

The present invention is made in order to solve the problem mentioned above, and an object of the present invention is to provide a tire vulcanizing apparatus which can reduce the time loss and can efficiently vulcanize and mold by excluding the cradle and the tire supplying apparatus, employing a tire loading apparatus for positively loading the green tire, and forming a moving unit in which the tire loading apparatus and the lower mold are integrally connected.

DISCLOSURE OF THE INVENTION

In order to achieve the object mentioned above, in accordance with the present invention, there is provided a tire vulcanizing apparatus comprising:

a tire loading apparatus which loads a green tire at a tire loading position and moves the loaded green tire to a tire supplying position;

a tire elevating apparatus which elevates at the tire supplying position so as to receive the green tire on the tire loading apparatus and sets the green tire to a lower mold; and an upper mold which elevates at a tire vulcanizing position so as to vulcanize and mold the green tire with respect to the lower mold, wherein a moving unit in which the tire loading apparatus and the lower mold are integrally connected is formed, and wherein the tire loading apparatus and the lower mold simultaneously reciprocate between the respective positions by reciprocating the moving unit.

In accordance with the invention, the lower mold reciprocates between the tire supplying position and the tire vulcanizing position at the same time when the tire loading apparatus reciprocates between the tire loading position and the tire supplying position, on the basis of the reciprocation of the moving unit.

Since three positions comprising the tire loading position, the tire supplying position and the tire vulcanizing position are set as mentioned above, each of the tires sequentially moves to one forward position in accordance with one reciprocation of the moving unit, and the next process is applied at each of the moved positions.

Accordingly, it is possible to improve an operation efficiency of a continuous operation comprising tire loading, tire supplying and tire vulcanizing.

Further, since the tire loading apparatus positively loads the green tire at the tire loading position, it is possible to exclude the cradle and the tire supplying apparatus, which is different from conventional structures.

Accordingly, it is possible to exclude an influence applied to each of the apparatuses generated together with the matter that it is necessary to move the cradle in correspondence to the elevating timing of the tire supplying apparatus, it is possible to reduce a time loss and it is possible to efficiently vulcanize and mold.

BRIEF DESCRIPTION OF THE DRAWINGS

FIG. 3 is a schematic view for explaining an operation of a conventional vulcanizing apparatus.

DETAILED DESCRIPTION OF THE PREFERRED EMBODIMENTS

A description will be given below of a mode for carrying out the present invention on the basis of an embodiment shown in the accompanying drawings.

Figure 1:
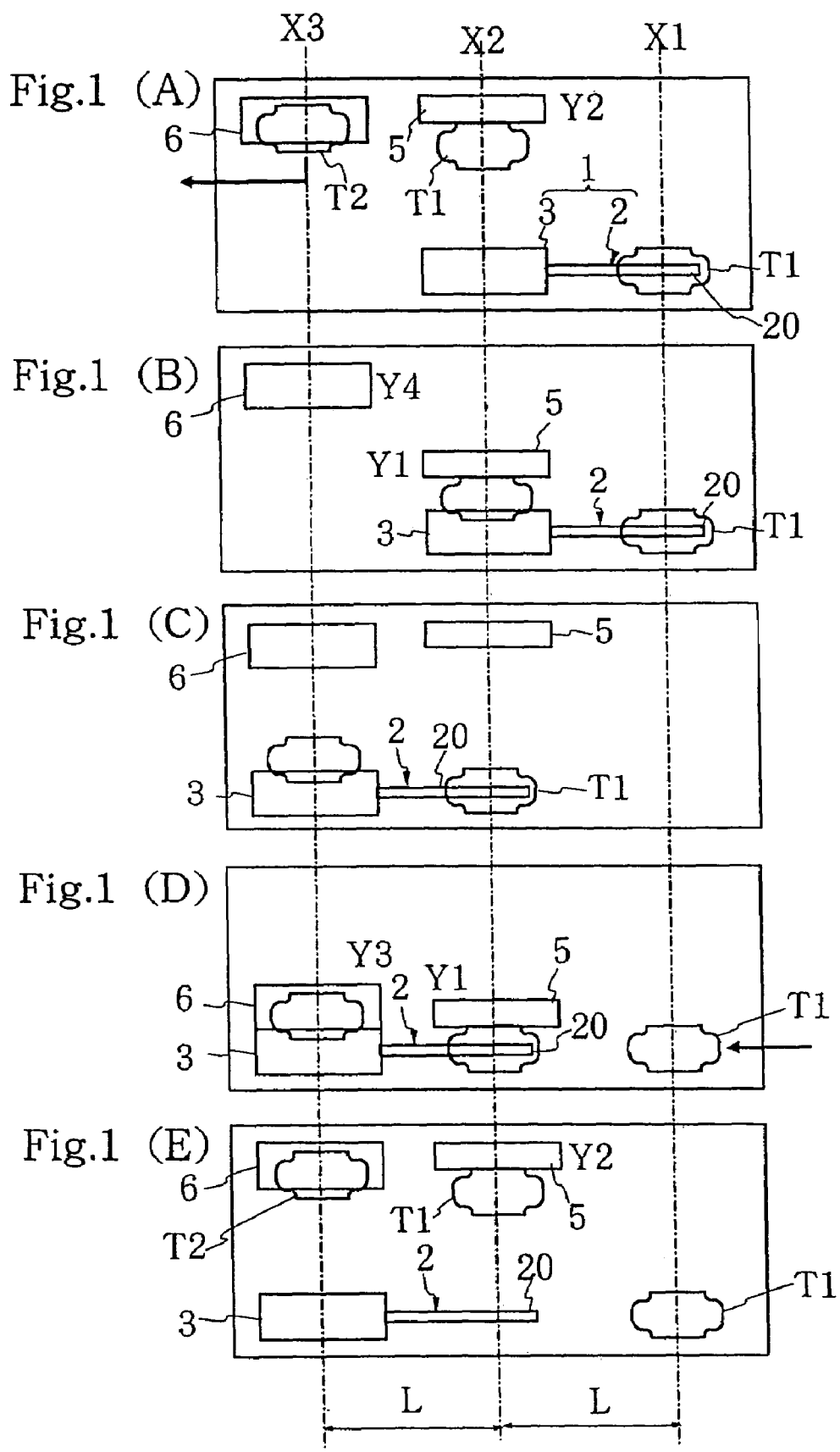
FIG. 1 is a schematic view for explaining an operation of a tire vulcanizing apparatus in accordance with an embodiment of the present invention.
Figure 2:
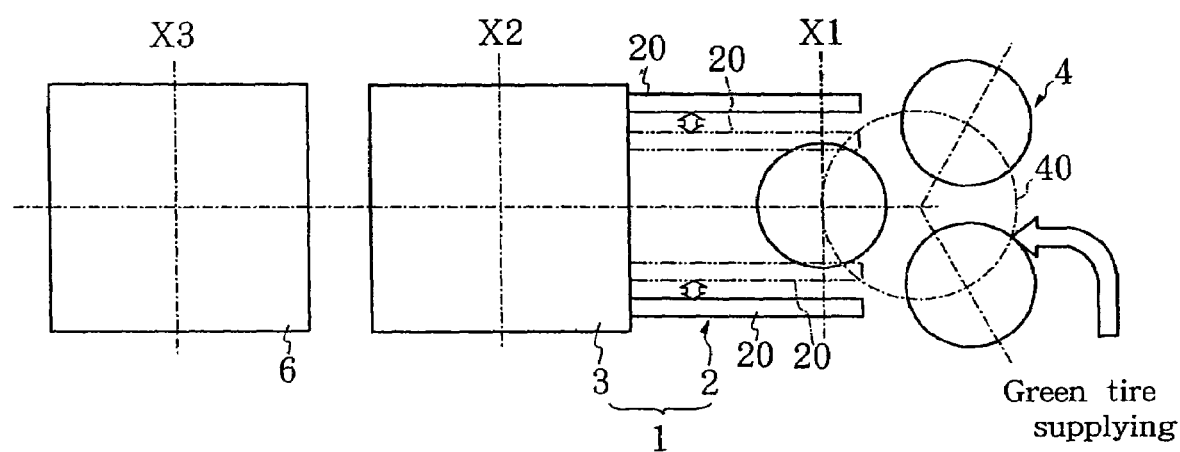
FIG. 2 is a schematic plan view of the tire vulcanizing apparatus.

FIG. 1 is a schematic view for explaining an operation of a tire vulcanizing apparatus in accordance with an embodiment of the present invention, and FIG. 2 is a schematic plan view of the tire vulcanizing apparatus.

In the tire vulcanizing apparatus, three positions comprising a tire loading position X1, a tire supplying position X2 and a tire vulcanizing position X3 are sequentially arranged at the same arrangement interval L.

In the drawings, reference numeral 1 denotes a moving unit. The moving unit 1 is structured such that a tire loading apparatus 2 and a lower mold 3 are integrally connected, an interval between the tire loading apparatus 2 and the lower mold 3 is kept in the arrangement interval L, and the lower mold 3 is reciprocated between the tire supplying position X2 and the tire vulcanizing position X3 at the same time when the tire loading apparatus 2 is reciprocated between the tire receiving position X1 and the tire supplying position X2.

In this case, it is preferable that the moving unit 1 is structured in an optionally movable aspect by assembling the tire loading apparatus 2 and the lower mold 3 in a self-propelled supply car or the like.

The tire loading apparatus 2 loads a green tire T1 at the tire loading position X1, and moves the loaded green tire T1 to the tire supplying position X2.

In this case, the tire loading apparatus 2 has a pair of right and left arms 20 and 20 which can be opened and closed in a lateral direction, and holds the green tire T1 on a tire stock 4 (shown in FIG. 2) while clamping between the arms 20 and 20 in accordance with the movement of a pair of right and left arms 20 and 20 in an opposing direction at the tire loading position X1. Next, the tire loading apparatus 2 moves to the tire supplying position X2 in this state, and releases the green tire T1 on the basis of the movement of the arms 20 and 20 in a disengaging direction, at a time when the tire elevating apparatus 5 grips the green tire T1.

In this case, the tire stock 4 has a turn table 40 mounting a plurality of (three in the embodiment) green tires T1 thereon at a uniform interval, for example, as shown in FIG. 2, and moves each of the green tires T1 sequentially to the tire loading position X1 on the basis of a turning motion of the turn table 40, and each of the green tires T1 is loaded sequentially by the tire loading apparatus 2.

The green tire T1 may be supplied to the turn table 40 on the basis of manual operation by a worker or may be supplied by a supplying apparatus for exclusive use.

The green tire T1 may be directly supplied to the tire loading position X1 on the basis of manual operation without using the turn table.

The lower mold 3 vulcanizes and molds the green tire T1 with respect to an upper mold 6 mentioned below, and is provided with a center mechanism (not shown) for shaping the green tire T1 by a bladder in a center thereof.

The tire elevating apparatus 5 is provided at the tire supplying position X2 so as to freely elevate. The tire elevating apparatus 5 ascends to an ascent position after receiving the green tire T1 on the tire loading apparatus 2 at a descent position Y1, and next descends so as to set the green tire T1 to the lower mold 3.

The upper mold 6 is provided in the tire vulcanizing position X3 so as to freely elevate. The upper mold 6 vulcanizes and molds the green tire T1 with respect to the lower mold 3 at a descent position Y3, thereafter ascends to an ascent position Y4 while holding the vulcanized tire T2, and passes the vulcanized tire T2 to the next step (for example, a pressurizing and cooling apparatus: PCI apparatus) at an ascent position Y4.

In the tire vulcanizing apparatus in accordance with the present embodiment, when the tire loading apparatus 2 positively loads the green tire T1 from the turn table 40 of the tire stock 4 at the tire loading position X1 (FIG. 1A), the green tire T1 is moved to the tire supplying position X2 on the basis of the movement of the moving unit 1 (FIG. 1C).

In this case, during a period that the tire loading apparatus 2 loads the green tire T1, the tire elevating apparatus 5 which has already held the green tire T1 descends at the tire supplying position X2, and sets the green tire T1 to the lower mold 3 at the descent position Y1 (FIG. 1B), and the lower mold 3 in which the green tire T1 is set is moved to the tire vulcanizing position X3 on the basis of the movement of the moving unit 1 (FIG. 1C).

When the tire loading apparatus 2 loading the green tire T1 from the turn table 40 in the manner mentioned above is moved to the tire supplying position X2 (FIG. 1C), the tire elevating apparatus 5 descends here so as to receive the green tire T1 (FIG. 1D), and waits at the ascent position Y2 (FIG. 1E).

In this case, the already supplied green tire T1 is vulcanized and molded by the upper mold 6 and the lower mold 3 at the tire vulcanizing position X3 during this period (FIG. 1D).

When the vulcanization and molding of the green tire T1 is finished by the upper mold 6 and the lower mold 3 at this tire vulcanizing position X3, the vulcanized tire T2 ascends to the ascent position Y4 in a state of being held by the upper mold 6 (FIG. 1E), and is passed to the next step (for example, the pressurizing and cooling apparatus: PCI apparatus).

In this case, when the upper mold 6 ascends while holding the vulcanized tire T2 as mentioned above, the green tire T1 on the tire loading apparatus 2 is received by the tire elevating apparatus 5 at the tire supplying position X2 during this period (FIG. 1E). accordingly, the tire loading apparatus 2 constituting the moving unit 1 and the lower mold 3 are both in an empty state.

At the same time, when the moving unit 1 moves and the tire loading apparatus 2 moves to the tire loading position X1, the lower mold 3 moves to the tire supplying position X2 (FIG. 1A), and thereafter a continuous operation comprising tire loading, tire supplying and tire vulcanizing is carried out while repeating the operation mentioned above.

As mentioned above, in the tire vulcanizing apparatus, at the same time when the tire loading apparatus 2 reciprocates between the tire loading position X1 and the tire supplying position X2 on the basis of the reciprocation of the moving unit 1, the lower mold 3 reciprocates between the tire supplying position X2 and the tire vulcanizing position X3.

As mentioned above, three positions comprising the tire loading position X1, the tire supplying position X2 and the tire vulcanizing position X3 are set, and the moving unit 1 reciprocates at one time, whereby each of the tires T1 and T2 is sequentially moved to one forward position, and the following processes are respectively applied to the respective moved positions.

For example, the green tire T1 is set to the lower mold 3 at the tire supplying position X2 at the same time when the green tire T1 is loaded at the tire loading position X1, and the green tire T1 is received by the tire elevating apparatus 5 at the tire supplying position X2 at the same time when the vulcanizing and molding process is executed at the tire vulcanizing position X3.

INDUSTRIAL APPLICABILITY

As described above, in accordance with the tire vulcanizing apparatus of the present invention, since three positions comprising the tire loading position, the tire supplying position and the tire vulcanizing position are set as mentioned above, each of the tires sequentially moves to one forward position in accordance with one reciprocation of the moving unit, and the next process is applied at each of the moved positions.

Accordingly, it is possible to improve the operational efficiency of a continuous operation comprising tire loading, tire supplying and tire vulcanizing.

Further, since the tire loading apparatus positively loads the green tire at the tire loading position, it is possible to exclude the cradle and the tire supplying apparatus, which is different from the conventional structure.

Accordingly, it is possible to exclude the influence applied to each of the apparatuses generated together with the matter that it is necessary to move the cradle in correspondence to the elevating timing of the tire supplying apparatus, it is possible to reduce time loss and it is possible to efficiently vulcanize and mold.

What is claimed is:

1. A tire vulcanizing apparatus comprising:
    tire loading means for loading a green tire at a tire loading position and moving the green tire to a tire supplying position and comprising means for grasping and releasing the green tire;
    tire elevating means for removing the green tire from the tire loading means, raising the green tire and lowering the green tire into a lower mold at the tire supplying position;
    a lower mold for receiving the green tire at the tire supplying position and moving the green tire to a tire vulcanization position;
    an upper mold for lowering onto the lower mold containing the green tire, vulcanizing the green tire therebetween and raising the vulcanized tire from the lower mold at the tire vulcanization position; and
    movement means for simultaneously moving the tire loading means and the lower mold in a reciprocating manner between the respective positions;
    wherein the tire loading means and the lower mold are integrally connected with each other.

* * * * *